(12) United States Patent
Mehta et al.

(10) Patent No.: US 10,743,232 B1
(45) Date of Patent: Aug. 11, 2020

(54) CONTROLLING HANDOVER BASED ON CARRIER-AGGREGATION POLICIES AND UE CAPABILITIES

(71) Applicant: Sprint Spectrum L.P., Overland Park, KS (US)

(72) Inventors: Dhaval Mehta, Aldie, VA (US);
Jasinder P. Singh, Olathe, KS (US);
Udit Thakore, Fairfax, VA (US);
Sanghoon Sung, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 304 days.

(21) Appl. No.: 15/352,129

(22) Filed: Nov. 15, 2016

(51) Int. Cl.
*H04W 36/00* (2009.01)
*H04L 5/00* (2006.01)
*H04W 36/38* (2009.01)
*H04W 8/22* (2009.01)
*H04W 36/30* (2009.01)

(52) U.S. Cl.
CPC ........... *H04W 36/38* (2013.01); *H04L 5/0041* (2013.01); *H04W 8/22* (2013.01); *H04W 36/0072* (2013.01); *H04W 36/0094* (2013.01); *H04W 36/30* (2013.01)

(58) Field of Classification Search
CPC . H04W 36/38; H04W 36/30; H04W 36/0094; H04W 8/22; H04W 36/0072; H04L 5/0041
See application file for complete search history.

(56) References Cited

U.S. PATENT DOCUMENTS

| 9,479,989 | B1 | 10/2016 | Mehta et al. | |
|---|---|---|---|---|
| 2012/0302245 | A1 | 11/2012 | Huang | |
| 2013/0165126 | A1 | 6/2013 | Wei | |
| 2013/0189971 | A1 | 7/2013 | Callender et al. | |
| 2014/0045504 | A1* | 2/2014 | Jung | H04L 5/0035 455/438 |
| 2014/0142064 | A1 | 5/2014 | Baker et al. | |
| 2015/0141014 | A1 | 5/2015 | Huang et al. | |
| 2015/0173009 | A1 | 6/2015 | Vallath et al. | |
| 2015/0327094 | A1 | 11/2015 | Lee et al. | |
| 2016/0080997 | A1* | 3/2016 | Hu | H04W 36/0055 455/442 |
| 2017/0034709 | A1* | 2/2017 | Hapsari | H04W 24/00 |

* cited by examiner

*Primary Examiner* — Joseph E Dean, Jr.

(57) ABSTRACT

A base station may use another base station's carrier-aggregation policy for a cell and carrier-aggregation capability information for a UE as a basis to control handover of the UE from the base station to the other base station. As one example, a first base station may receive, from a UE, a report that the UE has detected coverage of a target cell. The target cell may be provided by a second base station, and the first base station may determine whether the target cell can be aggregated with one or more other cells and whether the UE supports carrier aggregation. The first base station may then select a handover threshold based on the determination, and use the selected handover threshold as a basis to control handover of the UE from being served by the first base station to being served by the second base station.

17 Claims, 6 Drawing Sheets

CELL ID: 1
    BANDWIDTH: 10 MHz
    CARRRIER-AGGREGATION POLICY:
        PCELL: YES
        # SCELLS: 1
        SCELL ID(s): 2
        MAX BANDWIDTH: 20 MHz CELL ID: 2
    BANDWIDTH: 10 MHz
    CARRRIER-AGGREGATION POLICY:
        PCELL: YES
        # SCELLS: 2
        SCELL ID(S): 1, 3
        MAX BANDWIDTH: 40 MHz CELL ID: 3
    BANDWIDTH: 20 MHz
    CARRRIER-AGGREGATION POLICY:
        PCELL: YES
        # SCELLS: 1
        SCELL ID(S): 1
        MAX BANDWIDTH: 30 MHz

CONTROLLING HANDOVER BASED ON CARRIER-AGGREGATION POLICIES AND UE CAPABILITIES

BACKGROUND

In a wireless communication system, a base station may provide one or more coverage areas, such as sectors, in which the base station may serve user equipment devices (UEs), such as cell phones, wirelessly-equipped personal computers or tablets, tracking devices, embedded wireless communication modules, or other devices equipped with wireless communication functionality. In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs. For instance, the air interface may define one or more downlink traffic channels and downlink control channels, and one or more uplink traffic channels and uplink control channels.

In accordance with the Long Terminal Evolution (LTE) standard of the Universal Mobile Telecommunications System (UMTS), a base station (e.g., an eNodeB) may provide multiple sectors. In each sector, the base station may provide service on one or more carriers spanning 3 MHz, 5 MHz, 10 MHz, 15 MHz, or 20 MHz. Each carrier in a particular sector defines a "cell". For example, if a base station provides three sectors and provides service on two carriers per sector, the base station provides six cells. In some examples, there could be multiple cells at the same physical location, each provided by the same base station, and each being on a different carrier.

In an LTE system, each eNodeB has a global eNodeB ID and each sector of an eNodeB has a sector ID. Further, since each carrier in a particular sector defines a cell, each cell of a sector has a cell ID. Thus, at the system level, each combination of global eNodeB ID and cell ID defines a globally unique identifier for a cell. This globally unique identifier is referred to as an Evolved Universal Terrestrial Radio Access Network (E-UTRAN) cell global identifier (ECGI). At the physical level, each cell provided by an eNodeB also has a physical cell identifier (PCI) that is identifiable by a UE. While an ECGI is globally unique within a public land network, there are only 504 possible PCIs. Thus, PCIs are likely to be repeated many times throughout a public land mobile network. In practice, each eNodeB may store a mapping between the PCI and cell ID of each of its cells.

Further, an LTE system may support handover of a UE from one cell to another. For instance, when a first eNodeB is serving a UE and the UE detects sufficiently strong coverage from a cell of a second eNodeB, the UE may send a report to the first eNodeB indicating the detected PCI of the cell of the second eNodeB. The first eNodeB may in turn determine if applicable handover thresholds are met. If so, the first eNodeB may engage in handover signaling via an interface with the other eNodeB to orchestrate handover of the UE to the reported cell.

In LTE, the handover signaling may occur over an interface used to interconnect eNodeBs, such as an X2 interface. When an X2 interface is provisioned between two eNodeBs, each eNodeB shares with the other neighbor eNodeB (i) its eNodeB global ID and (ii) each of its cell IDs and corresponding PCIs. Thus, an eNodeB may have a record of a neighbor eNodeB's cell IDs and, for each cell, the corresponding PCI. In addition, eNodeBs may use the X2 interface to report their respective load to their neighboring eNodeBs on a per-cell basis.

Furthermore, a revision of LTE known as LTE-Advanced now permits an eNodeB to serve a UE with "carrier aggregation," by which the eNodeB schedules bearer communication with the UE on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between an eNodeB and a UE using a single carrier is 20 MHz. Using carrier aggregation, an eNodeB may increase the maximum bandwidth to up to 100 MHz by aggregating up to five carriers. Each aggregated carrier is referred to as a component carrier. Further, when multiple carriers are aggregated, one of the component carriers may be defined as a primary cell ("PCell") and the remaining component carriers may be defined as secondary cells ("SCells").

Depending on the desired implementation, an eNodeB may be carrier aggregation capable or not. If an eNodeB is carrier aggregation capable, the eNodeB may have certain policies regarding which of its carriers, per sector, can be combined together to provide carrier aggregation. By way of example, an eNodeB may have a carrier-aggregation policy that indicates which carrier(s) can be used as a PCell in combination with which one or more carriers being SCell(s). For instance, in one scenario, a carrier-aggregation policy may indicate that a first carrier and a second carrier may be used as PCells, but a third carrier may not be used as a PCell. Further, the carrier-aggregation policy may indicate that (i) the first carrier can be a PCell with the second carrier as an SCell, but not with the third carrier as an SCell, but (ii) the second carrier can be a PCell with both the first carrier and the third carrier as SCells. Thus, if the first carrier is used as a PCell, the eNodeB may aggregate two carriers, but if the second carrier is used as a PCell, the eNodeB may aggregate three carriers.

In practice, an eNodeB may implement a carrier-aggregation policy for a number of reasons. As one example, certain pairs of carriers may be undesirable to combine because concurrent transmission on the two carriers could give rise to intermodulation distortion. For instance, concurrent transmission on two particular carriers may combine to produce an undesirable radio frequency (RF) byproduct. If an eNodeB engages in carrier aggregation with a UE on the two carriers, the UE or eNodeB may receive the RF byproduct, thus interfering with the transmissions on the two carriers. As another example, an eNodeB may implement a carrier-aggregation policy that is dynamically modified over time based on the level of congestion in the control channel region of a particular cell. For instance, if all control signaling is configured to occur on PCells rather than SCells, and a control channel region of the particular cell is threshold highly congested, then it may be desirable to avoid using that cell as a PCell, but allow the cell to be used as an SCell.

Overview

In a system as described above, a base station may use information regarding a neighboring base station's cell IDs and corresponding PCIs as a basis to manage handover of a UE. For instance, the base station may use the information to decide whether to grant a handover when the UE reports having detected coverage from one of those PCIs.

In such a system, it may also be useful for a base station to use a neighboring base station's carrier-aggregation capabilities and a UE's carrier-aggregation capabilities as a basis to manage handover. More specifically, when a base station receives a report from a UE and the report indicates that the UE has detected coverage of a target cell of a neighboring base station, it may be advantageous for the base station to use the carrier-aggregation capabilities of the target cell and the carrier-aggregation capabilities of the UE as a basis to manage handover.

As one example, it may be advantageous for the base station to manage handover of the UE based on a comparison of the carrier-aggregation capabilities of the target cell and the carrier-aggregation capabilities of the UE. For instance, if the UE is capable of supporting carrier aggregation and the neighboring base station would be able to support carrier aggregation on the target cell, it may be acceptable for the base station to hand over the UE to the target cell, such that the neighboring base station can provide the UE with carrier aggregation service. However, if the UE is capable of supporting carrier aggregation but the neighboring base station would not be able to support carrier aggregation on the target cell, it may be advantageous for the base station to delay handover of the UE to the target cell, perhaps with the goal of the UE subsequently being handed over to another cell that would be able to support carrier aggregation.

Likewise, if the UE is not capable of supporting carrier aggregation and the neighboring base station would not be able to support carrier aggregation on the target cell, it may be acceptable for the base station to hand over the UE to the target cell. However, if the UE is not capable of supporting carrier aggregation and the neighboring base station would be able to support carrier aggregation on the target cell, it may be advantageous for the base station to delay handover of the UE to the target cell, such that resources of the target cell may be reserved for other UEs that support carrier aggregation.

The present disclosure provides methods and corresponding systems for managing handover of a UE on the basis of a comparison of carrier-aggregation capabilities of the UE and carrier-aggregation capabilities of a target cell. At issue in the present disclosure may be whether the UE is capable of supporting the carrier-aggregation capabilities that the target cell supports. If the UE is capable of supporting the carrier aggregation that the target cell supports, then the base station serving the UE may impose a lenient handover threshold that increases the likelihood of handover of the UE to the target cell. Whereas, if the UE is not capable of supporting the carrier aggregation that the target cell supports, then the base station may impose a more stringent handover threshold that decreases the likelihood of handover of the UE to the target cell. In either case, the base station may then use the imposed handover threshold as a basis to determine whether to trigger handover of the UE from the base station to the neighboring base station that provides the target cell.

In one example scenario, a first base station may receive a report from a UE being served by the first base station. The report may indicate that the UE has detected coverage of a target cell, and the target cell may be provided by a second base station. The first base station may then make a determination of whether the target cell can be aggregated with one or more other cells and whether the UE supports carrier aggregation. Further, the first base station may select, based on the determination, a handover threshold, and the first base station may use the selected handover threshold as a basis to control handover of the UE from being served by the first base station to being served by the second base station.

In practice, the handover threshold may take various forms. For instance, the handover threshold may be a minimum extent that signal level of the target cell is required to exceed signal level of a serving cell in order to trigger the handover, or the handover threshold may be a minimum signal level of the target cell in order to trigger the handover. With either type of handover threshold, if the first base station determines that the target cell can be aggregated with one or more other cells but that the UE does not support carrier aggregation or determines that the UE does support carrier aggregation but that the target cell cannot be aggregated with one or more other cells, the first base station may select a first threshold. Whereas, if the first base station determines that the target cell can be aggregated with one or more other cells and that the UE supports carrier aggregation, then the first base station may select a second threshold that is a lower threshold than the first threshold, to allow the handover to more readily occur. And if the first base station determines that the target cell cannot be aggregated with one or more other cells and that the UE does not support carrier aggregation, then the first base station may select a third threshold that is also lower than the first threshold, to likewise allow the handover to more readily occur.

Accordingly, disclosed herein is a method that may be operable in a radio access network (RAN) including a first base station and a second base station. The method may involve receiving by the first base station, from a UE being served by the first base station, a report that the UE has detected coverage of a target cell. The target cell may be provided by the second base station. The method may also involve making a determination by the first base station of (i) whether the target cell can be aggregated with one or more other cells and (ii) whether the UE supports carrier aggregation. Further, the method may involve selecting by the first base station a handover threshold, with the handover threshold being selected based on the determination. Still further, the method may involve using by the first base station the selected handover threshold as a basis to control handover of the UE from being served by the first base station to being served by the second base station.

In another respect, disclosed is a base station that may include an antenna structure for wirelessly communicating with UEs and a controller. The controller may be arranged to receive via the antenna arrangement, from a UE served by the base station, a report that the UE has detected coverage of a target cell. The target cell may be provided by a neighboring base station. The controller may also be arranged to make a determination of (i) whether the target cell can be aggregated with one or more other cells and (ii) whether the UE supports carrier aggregation. Further, the controller may be arranged to select a handover threshold, with the handover threshold being selected based on the determination. Still further, the controller may be arranged to use the selected handover threshold as a basis to control handover of the UE from being served by the base station to being served by the neighboring base station.

Still further, in another respect, disclosed is a method that may be operable in a radio access network that includes a first base station and a second base station, with the first base station being configured to provide UEs with carrier aggregation service. The method may involve receiving by the first base station, from a UE being served by the first base station, a report that the UE has detected coverage of a particular carrier, wherein the particular carrier is provided by the second base station. The method may also involve determining by the first base station that the second base station is not configured to provide UEs with carrier aggregation service on the particular carrier. Further, the method may involve the first base station determining whether the UE supports carrier aggregation. Still further, the method may involve the first base station selecting a handover threshold, with the handover threshold being selected based on the determination. Still further, the method may involve the first base station using the selected handover threshold as a basis to control handover of the UE from being served by the first base station to being served by the second base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which the present disclosure can be implemented. It should be understood, however, that this and other arrangements described herein are set forth only as examples. As such, those skilled in the art will appreciate that other arrangements and elements (e.g., machines, interfaces, functions, orders, and grouping of functions, etc.) can be used instead, and that some elements may be omitted altogether. Further, many of the elements described herein are functional entities that may be implemented as discrete or distributed components or in conjunction with other components, and in any suitable combination and location. And various functions described herein as being performed by one or more entities may be carried out by hardware, firmware, and/or software.

Figure 1:
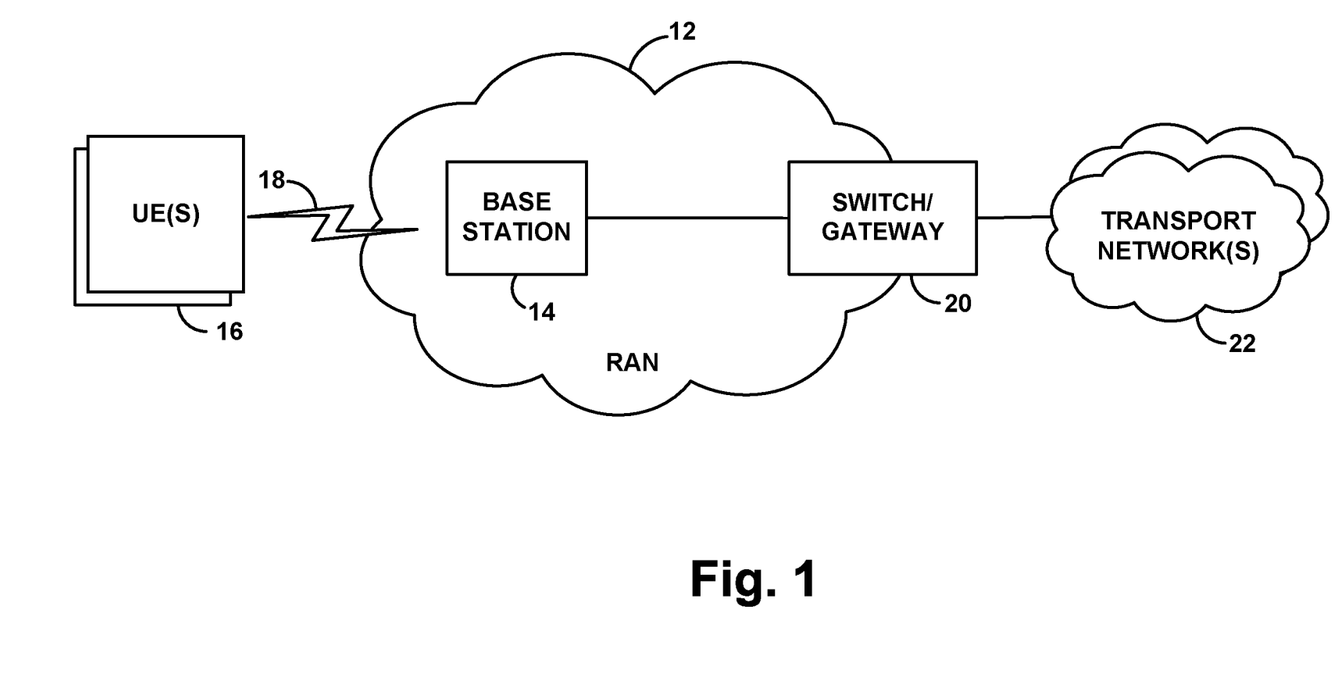
FIG. 1 is a simplified block diagram of an example wireless communication system in which the present disclosure can be implemented.

FIG. 1 depicts the example communication system as including at its core a RAN 12 having a representative base station 14, with the base station 14 being arranged to serve UE(s) 16 in a coverage area through an air interface 18. The base station may be a macro base station that is positioned at a fixed location and provides fairly wide coverage from that location. Alternatively, the base station may be a small cell base station that is currently located at a particular location and provides more restricted coverage from that location. Other examples of base stations are possible as well.

RAN 12 further includes by way of example a switch or gateway 20 that provides connectivity with one or more transport networks 22, such as the PSTN or the Internet for instance. With this arrangement, each UE that is in coverage of the base station and that is suitably equipped may register or attach with the RAN and may engage in air interface communication with the base station so as to communicate in turn with various remote entities on the transport network(s) and/or with the other UEs served by the RAN. Numerous variations from this arrangement are possible, however. For instance, the RAN may include more than one switch or gateway and may include various components between each switch or gateway and the transport network(s).

In this arrangement, the air interface 18 may be configured according to a particular air interface protocol, and the UE and base station may be programmed or otherwise configured to operate according to that protocol. Examples of existing air interface protocols include, without limitation, Orthogonal Frequency Division Multiple Access (OFDMA (e.g., LTE), Code Division Multiple Access (CDMA) (e.g., 1×RTT and 1×EV-DO), Wireless Interoperability for Microwave Access (WiMAX), and Global System for Mobile Communications (GSM), among others. According to the air interface protocol, air interface 18 may thus define a plurality of resource blocks for carrying communications between the UEs and the base station.

Furthermore, with this arrangement, when the UE enters into coverage of base station 14, the UE may engage in a process to attach with, hand over to, or otherwise associate with the base station, which may result in establishment of a connection over the air interface between the UE and the base station so that the base station can then provide the UE with service. Per the present disclosure, in this attach process (or optionally at a later time), the base station could obtain a UE-capability report that would indicate whether the UE supports carrier aggregation, and the base station may store this information in a local context record for the UE.

In practice, some UEs may be capable of engaging in carrier aggregation, while other UEs might not be capable of engaging in carrier aggregation. Whether a UE is capable of engaging in carrier aggregation may depend on the hardware of the UE and/or the manner in which the UE is programmed or otherwise configured to operate. If the UE is capable of engaging in carrier aggregation, the UE-capability report may indicate that the UE supports carrier aggregation. Whereas, if the UE is not capable of engaging in carrier aggregation, the UE-capability report may indicate that the UE does not support carrier aggregation.

In some examples, the base station could obtain the UE-capability report directly from the UE. In other examples, the base station could obtain the UE-capability report from a network node that sits on the core network.

In an LTE system, for instance, when a UE first enters into coverage of a cell provided by base station 14, the UE may initially attach with and be served by base station 14 in that cell. In particular, the UE may detect coverage of the cell and may responsively engage in air interface access-channel signaling with base station 14, triggering the establishment of signaling radio bearers (SRBs) over which the UE can then engage in Radio Resource Control (RRC) connection signaling with the base station to establish an RRC connection (a type of radio-link-layer connection) between the UE and the base station. Once the UE has an established RRC connection with the base station, the UE may then transmit to the base station, over an SRB, an attach request, which the base station may forward to a mobility management entity (MME) for processing. Upon authenticating and authorizing the UE for service, the MME may then engage in signaling with a serving gateway (SGW) and base station to establish for the UE of one or more access bearers between the base station and a packet data network gateway (PGW) for carrying data between the UE and the transport network 22. And the MME may then transmit to the base station (in an initial context setup request message) an attach accept message, which the base station may forward to the UE.

As another step of this attachment process, the base station could also transmit to the UE an RRC message carrying a UE-capability enquiry, and the UE could respond to the base station with a "UE capability information" information element (IE). This UE capability information IE could comprise a set of feature group indicator (FGI) bits, each mapped to a particular capability, and each having a value (0 or 1) indicating whether or not the UE has that capability. The UE and the base station could each be configured to understand these bits and their mappings, so that the UE transmitting the FGI bits to the base station functions to inform the base station what capabilities the UE has and does not have.

One of the FGI bits could be leveraged to facilitate the presently disclosed processes. For example, by setting a particular one of the FGI bits to zero in its UE capability information IE to the base station, the UE could indicate that it does not support carrier aggregation. On the other hand, by the setting the particular FGI bit to one in its UE capability information IE to the base station, the UE could indicate that it does support carrier aggregation.

Alternatively, instead of transmitting the UE-capability enquiry to the UE, the base station could transmit a similar enquiry to the MME, and the MME could respond to the base station with a "UE capability information" information element (IE) or another type of report indicating whether the UE supports carrier aggregation. The MME may have a communication interface with a home subscriber server (HSS). The MME could use the communication interface to communicate a request for UE-capability information to the HHS, and the MME could then receive such information from the HSS and convey that information to the base station. And the base station may then store this information in the context record for the UE.

While connected to the base station, the UE may continue to regularly scan pilot or reference signals, from both the coverage area serving the UE and from various other coverage areas. Alternatively or additionally, the base station may direct the UE to engage in such scanning from time to time. As the UE carries out this scanning, the UE may thus again determine the signal level of various coverage areas, and the identities of those coverage areas.

Further, while connected to the base station, the UE may from time to time transmit to its serving base station a measurement report that specifies the signal level of each coverage area detected by the UE. In particular, the measurement report may specify each detected coverage area (e.g., by coverage area identifier) and the signal level (e.g., reference signal receive strength, or signal-to-noise ratio) of the coverage area as determined by the UE. In practice, a given measurement report may thus include such information for the UE's currently serving coverage area and may also include such information for each of one or more other coverage areas detected by the UE.

When the serving base station receives such a measurement report from the UE, if the measurement report specifies signal level of another coverage area, the base station may engage in a process to decide whether to trigger handover of the UE to the other coverage area. In general, this process may involve evaluating the reported signal level of the other coverage area to determine whether it is sufficiently strong itself and/or whether it is sufficiently stronger than the reported signal level of the serving coverage area. Further, the process may involve consideration of other factors as well, such as load and backhaul capacity for instance.

In terms of signal level, the base station may be configured to apply a handover threshold to determine whether to trigger the handover. Such a threshold may be a minimum extent to which the reported signal level of the target coverage area exceeds the reported signal level of the source coverage area in order to trigger the handover, and could be set by default at a value in the range of 2 to 10 dB for instance. Thus, if the base station determines that the reported signal level of the target coverage area exceeds the reported signal level of the serving coverage area by at least that minimum extent, then the base station may trigger the handover (possibly assuming other conditions are met as well), and otherwise the base station may not trigger the handoff.

Alternatively, the threshold may be more simply a minimum reported signal level of the target coverage area in order to trigger the handover, which could be for instance at least −100 dBm or some other default value. Thus, if the base station determines that the reported signal level of the target coverage area is at least that minimum signal level, then the base station may trigger the handover (again, possibly considering other factors as well), and otherwise the base station may not trigger the handover.

The process of triggering the handover may take various forms. In an LTE network, for instance, a serving base station would make the decision and would signal over an inter-base station link (X2 link) with the target base station to prepare the target base station for the handover, and the serving base station would then transmit to the UE a connection reconfiguration message directing the terminal to transition from being served by the serving base station to being served by the target base station. Further, through additional signaling, bearer connections and context for the UE would be transferred from the serving base station to the target base station, so that the UE can then continue its active connection via the target base station.

Figure 2:
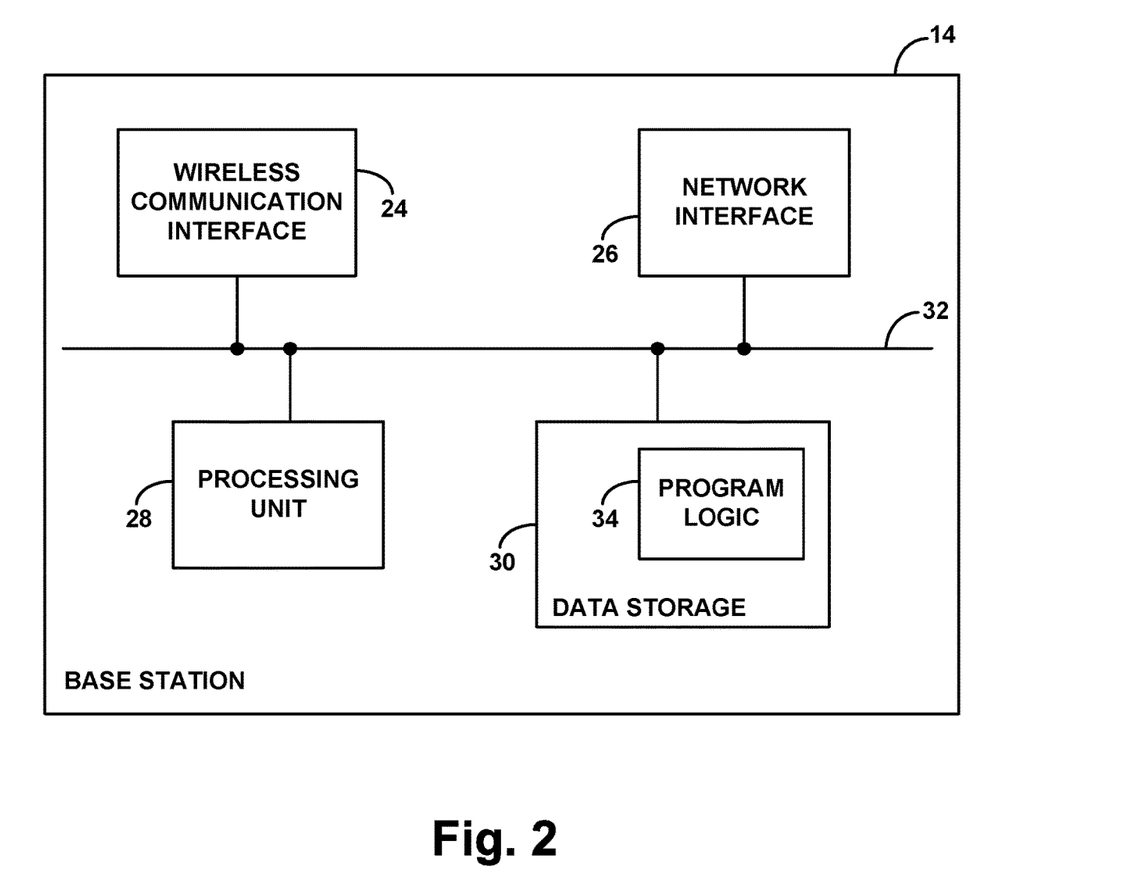
FIG. 2 is a block diagram of an example base station, in accordance with exemplary embodiments.

FIG. 2 is next a simplified block diagram of a representative base station 14, such as a base transceiver station, access node, access point, Node-B, or eNodeB, for instance (whether macro, femto or the like), illustrating some of the components that can be included in such an entity. As shown in FIG. 2, the representative base station 14 includes a wireless communication interface 24, a network interface 26, a processing unit 28, and data storage 30, all of which may be coupled together by a system bus, network or other connection mechanism 32.

Wireless communication interface 24 may function to engage in air interface communication with served devices, such as UEs 16. As such, wireless communication interface 24 may comprise an antenna arrangement (not shown), which may be tower mounted, and associated components such as a power amplifier and a cell site modem (not shown), so as to transmit and receive bearer and control data.

Network interface 26 may then comprise a wired or wireless interface for communicating with one or more other base stations. By way of example, the network interface 26 may be an interface through which the base station 14 is configured to receive information regarding cells provided by a neighboring base station. For instance, the neighboring base station may send to the base station 14 an indication of (i) the neighboring base station's ECGI and (ii) the cell ID and corresponding PCI of each cell provided by the neighboring base station. The base station 14 may store the information in the data storage 30. Thus, the base station 14 may have a record of the neighboring base station's ECGI and a mapping between the PCI and cell ID of each cell provided by the neighboring base station.

Furthermore, the base station 14 may be configured to receive carrier-aggregation policies from the neighboring station. For instance, the neighboring base station may send to the base station 14, for each cell provided by the neighboring base station, a respective carrier-aggregation policy for the cell.

In an LTE system, for instance, the network interface 26 may be an X2 interface. In this scenario, the neighboring base station may communicate information to the base station 14 by sending messages carrying information elements over the X2 interface. For example, a neighboring base station may communicate carrier-aggregation policies to the base station 14 when an X2 interface is provisioned between the neighboring base station and the base station 14 (e.g., upon manual neighbor relation establishment or through an automated neighbor relation process). Alternatively or additionally, the neighboring base station may communicate the carrier-aggregation policies to the base station 14 whenever the base station 14 modifies the carrier-aggregation policies. Other examples are also contemplated. Thus, the examples are not meant to be limiting.

Processing unit 28 may then comprise one or more general purpose processors (e.g., microprocessors) and/or one or more special-purpose processors (e.g., digital signal processors and/or application specific integrated circuits) and may be integrated in whole or in part with the wireless communication interface 24. And data storage 30 may comprise one or more volatile and/or non-volatile storage components, such as magnetic, optical, flash, or other types of non-transitory computer readable media, and may be integrated in whole or in part with processing unit 28.

As shown, data storage 30 may store program logic 34 (e.g., machine language instructions), which may be executable by processing unit 28 to carry out various base station functions described herein. For instance, program logic 30 may be executable to cause the base station to make a determination of (i) whether a target cell can be aggregated with one or more other cells and (ii) whether a UE supports carrier aggregation, and to select a handover threshold, with the handover threshold being selected based on the determination. Further, program logic 30 may be executable to cause the base station to use the selected handover threshold as a basis to control handover of the UE from being served by the base station to being served by a neighboring base station.

In accordance with the present disclosure, as discussed above, base station 14 may serve one or more UEs 16 via an interface. In one example, one of the UEs 16 may report to the base station 14 that the UE has detected a particular cell provided by a neighboring base station. For instance, the UE may send a report to the base station 14 indicating a PCI of the particular cell. The particular cell may be one of multiple co-located cells provided by the neighboring base station. By way of example, FIG. 3 is an illustration of an example wireless communication system in which this may occur.

Figure 3:
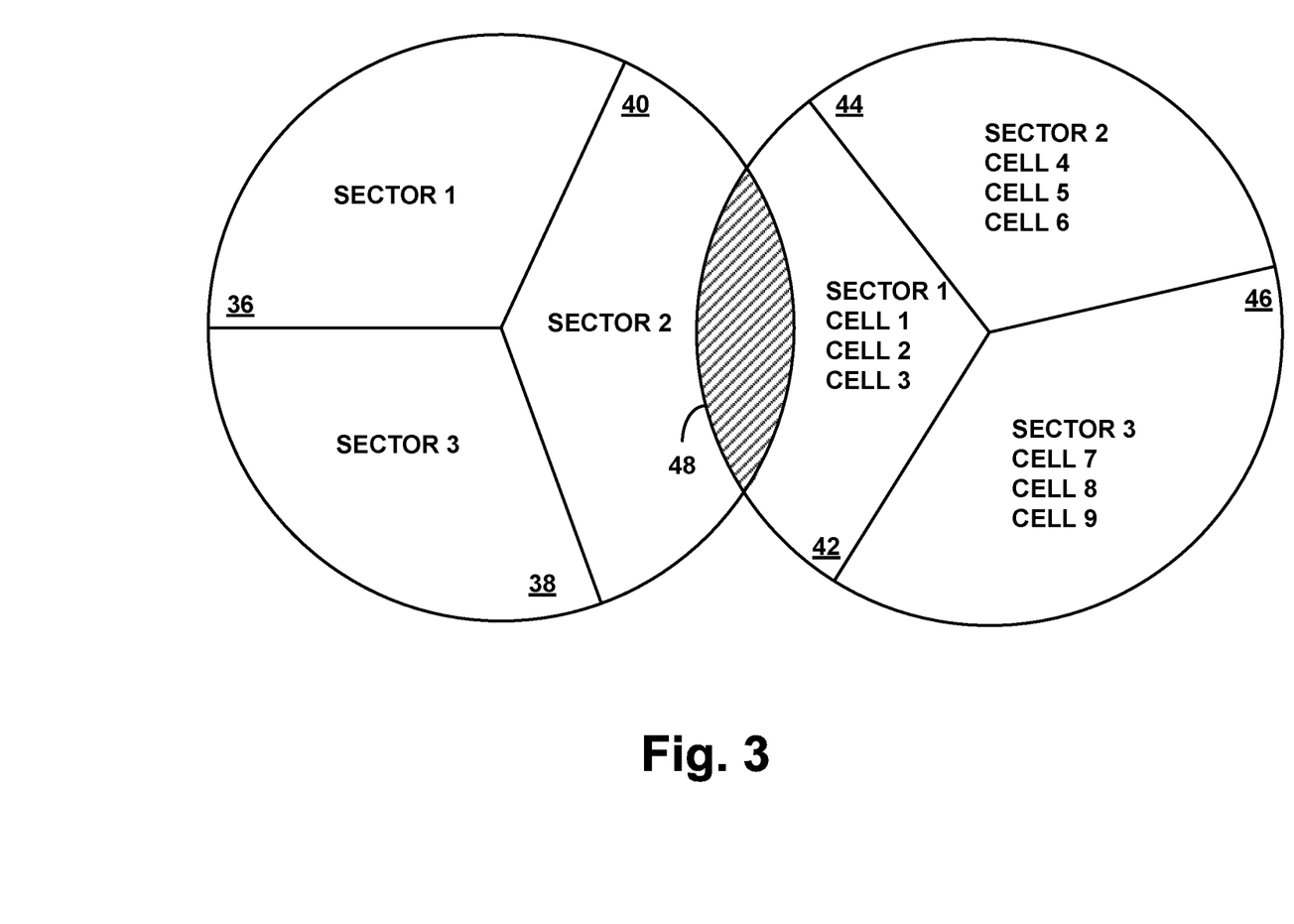
FIG. 3 is an illustration of an example wireless communication system.

FIG. 3 depicts the example wireless communication system as including multiple sectors 36, 38, 40 provided by base station 14 as well as multiple sectors 42, 44, 46 provided by a neighboring base station. In one example, the neighboring base station may provide multiple co-located cells within each of sectors 42, 44, 46. More specifically, within a first sector 42, the neighboring base station may provide three cells having respective cell IDs of 1, 2, and 3; within a second sector 44, the neighboring base station may provide three cells having respective cell IDs of 4, 5, and 6; and within a third sector 46, the neighboring base station may provide three cells having respective cell IDs of 6, 7, and 8. In some examples, base station 14 may also provide multiple co-located cells within one or more of sectors 36, 38, and 40 (not shown).

Note that the co-located cells at issue need not be coterminous. Rather, as used herein, two or more cells provided by a base station may be considered co-located if a UE can detect coverage of each of the two or more cells at one or more physical locations throughout a coverage area of the base station, perhaps with the cells having a common azimuth or the like defining a direction of radiation from the cell's origin location.

In one example, if a UE is being served by the base station 14 on a cell in sector 40 and is located within an area 48 in which sector 40 overlaps with the first sector 42 provided by the neighboring base station, the UE may detect sufficient coverage of a particular cell of the neighboring base station (e.g., cell 1, cell 2, or cell 3). Further, the UE may then provide to the base station 14 a report that the UE has detected the particular cell, and the report may include the PCI of the detected cell.

In line with the discussion above, the base station 14 may have a record of the mapping between PCIs and corresponding cell IDs for the cells provided by the neighboring base station. Further, the base station 14 may have received the carrier-aggregation policies for each cell of the neighboring base station from the neighboring base station. Thus, the base station 14 may be able to identify the cell ID of the detected cell based on the PCI reported by the UE. Using the cell ID, the base station may then identify the carrier-aggregation policy imposed by the neighboring base station for the detected cell.

Figure 4:
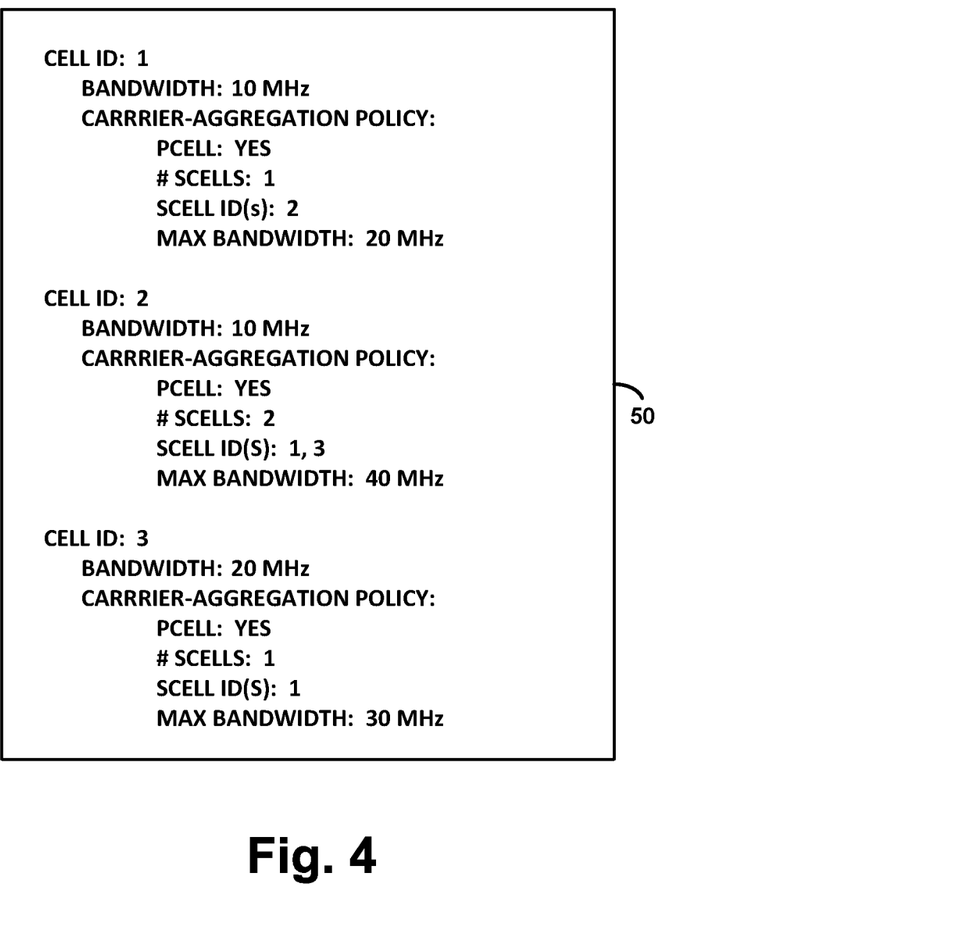
FIG. 4 is an illustration of example carrier-aggregation policies.

In practice, the carrier-aggregation policies implemented by the neighboring base station may take a number of forms. FIG. 4 is an illustration of carrier-aggregation policies 50 that the neighboring base station may implement by way of example. In particular, the figure depicts three example carrier-aggregation policies that the neighboring base station implements for cell 1, cell 2, and cell 3 respectively of the first sector 42.

As shown in FIG. 4, the example carrier-aggregation policy for cell 1 indicates that cell 1 may be configured as a PCell together with cell 2 as an SCell, providing a maximum carrier-aggregation bandwidth of 20 MHz. Further, the example carrier-aggregation policy for cell 2 indicates that cell 2 may be configured as a PCell together with cells 1 and/or 3 as an SCell(s), providing a maximum carrier-aggregation bandwidth 40 Mhz. And the example carrier-aggregation policy for cell 3 indicates that cell 3 may be configured as a PCell together with cell 1 as an SCell, providing a maximum carrier-aggregation bandwidth of 30 MHz.

The three example carrier-aggregation policies are provided for purposes of example. In other arrangements, a carrier-aggregation policy may include more or less information. For instance, in another arrangement, a carrier-aggregation policy may not indicate the maximum carrier-aggregation bandwidth.

As discussed above, the base station may dynamically select and apply a handover threshold to apply in a given instance based on a consideration of whether a target cell can be aggregated with one or more other cells and whether a UE supports carrier aggregation. To facilitate this, the base station may identify the carrier-aggregation capabilities of the UE and the carrier-aggregation capabilities of the target cell, and determine whether the UE is capable of supporting the carrier-aggregation capabilities that the target cell supports. And the base station may select a handover threshold based on that determination.

The base station may determine the carrier-aggregation capabilities of the UE by referring to information stored in a local context record for the UE. When the UE registered or attached with the base station, the base station may have stored in the local context record UE-capability information indicating whether the UE supports carrier aggregation. Prior to selecting the handover threshold to apply, the base station may refer to that information to determine whether the UE supports carrier aggregation.

The base station may determine the carrier-aggregation capabilities of the target cell based on policy information received from the neighboring base station. The base station may receive policy information from the neighboring base station, either when an X2 interface is provisioned between the neighboring base station or when the policy information is modified, and the base station may store the policy information for later reference. The policy information may indicate a carrier-aggregation policy that the neighboring base station imposes for the target cell. Prior to selecting the handover threshold to apply, the base station may refer to the stored policy information to determine the carrier-aggregation capabilities of the target cell. The UE may report to the base station the PCI of the detected cell. As discussed above, the base station can use the PCI to determine a corresponding cell ID, and use the cell ID to determine the carrier-aggregation policy imposed by the neighboring base station for the detected cell.

As noted above, if the base station determines that the target cell can be aggregated with one or more other cells but that the UE does not support carrier aggregation or determines that the UE does support carrier aggregation but that the target cell cannot be aggregated with one or more other cells, then the base station may select and apply a first handover threshold, such as a first minimum extent (e.g., 6 dB) or a first signal level (e.g., −100 dBm) as described above.

On the other hand, if the base station determines that the target cell can be aggregated with one or more other cells and that the UE supports carrier aggregation, then the base station may select and apply a second threshold that is lower than the first threshold, such as a second minimum extent (e.g., 2 dB) or a second minimum signal level (e.g., −110 dBm), to help foster handover of the UE to the target cell.

And if the base station determines that the target cell cannot be aggregated with one or more other cells and that the UE does not support carrier aggregation, then the base station may select and apply a third threshold that is also lower than the first threshold, to likewise help foster handover of the UE to the target cell. The third threshold may be the same as or different from the second threshold depending on the desired implementation.

To facilitate this, the base station may be configured with data that specifies various handover thresholds to apply, depending on (i) whether the target cell can be aggregated with one or more other cells and (ii) whether the UE supports carrier aggregation. Alternatively or additionally, the act of "selecting" a handover threshold may involve applying an offset to a default threshold. For example, if the first threshold is to be used, the offset may be a first offset, if the second threshold is to be used, the offset may be a second offset, and if the third threshold is to be used, the offset may be a third offset. And the data with which the base station is configured could specify such offsets, so that the base station can apply the appropriate offset depending on (i) whether the target cell can be aggregated with one or more other cells and (ii) whether the UE supports carrier aggregation.

In the arrangement of FIGS. 3 and 4, for instance, the UE may report to base station 14 that the UE has detected coverage of cell 1. According to the carrier-aggregation policies 50, cell 1 can be aggregated with cell 2. The base station may thus determine that cell 1 can be aggregated with one or more other cells by referring to the carrier-aggregation policy for cell 1. In that scenario, if the base station determines that the UE does not support carrier aggregation, then the base station may select and apply the first threshold. Whereas, if the base station determines that the UE does support carrier aggregation, then the base station may select and apply the second threshold, which is more lenient than the first threshold, to help foster handover of the UE to cell 1.

In some examples, the carrier-aggregation policy for the target cell may indicate that the target cell can be aggregated with a particular extent of additional cell bandwidth. For instance, the particular extent of additional cell bandwidth may be a particular number of other cells or a particular bandwidth. In such a scenario, the act of "selecting" a handover threshold may be further based on the particular extent of additional cell bandwidth.

As one example, if the base station determines that the target cell can be aggregated with a particular extent of additional cell bandwidth and the UE supports carrier aggregation, the base station may then further compare the particular extent of additional cell bandwidth to a cell bandwidth threshold, such as a number of SCells (e.g., 2) or a bandwidth threshold (e.g., 20 MHz). If the base station determines that the particular extent of additional cell bandwidth is less than the cell bandwidth threshold, then base station may select and apply the second threshold. Whereas, if the base station determines that the particular extent of additional cell bandwidth is greater than or equal to the cell bandwidth threshold, then the base station may select and apply a fourth threshold that is more lenient than the second threshold, to help foster the handover to the target cell. In this manner, when a UE supports carrier aggregation and the target cell can be aggregated with more additional cell bandwidth than the cell bandwidth threshold, the likelihood of the handover of the UE to the trigger can be increased even further, as compared to the likelihood of the handover of the UE when the target cell cannot be aggregated with more additional cell bandwidth than the cell bandwidth threshold.

Moreover, in some examples, the base station may provision the UE with certain measurement events defining reference-signal threshold levels at which the UE should transmit a measurement report to the base station. These measurement events are sometimes referred to as "A" events. The UE could thus periodically scan for and measure neighboring coverage strength. And when the UE detects threshold strong neighboring coverage per an event, the UE could then generate and transmit to its serving base station a measurement report specifying the detected neighboring coverage, and the base station could responsively process handover of the UE to that neighboring coverage.

In order to be able to help foster handover of a UE in scenarios where the UE is capable of supporting the carrier-aggregation capabilities that the target cell supports, the base station could provision the UE with a baseline threshold for a given measurement event that would trigger the UE to provide a measurement report. This baseline threshold could be a lenient threshold that is lower than the first, second, and third thresholds discussed above. With such a lenient threshold, the amount of measurement reports that the UE provides could be more than an amount of measurement reports that the UE would provide if the threshold were higher. Upon receiving such measurement reports, the base station could then apply the appropriate first, second, or third threshold, and determine whether to trigger a handover.

Figure 5:
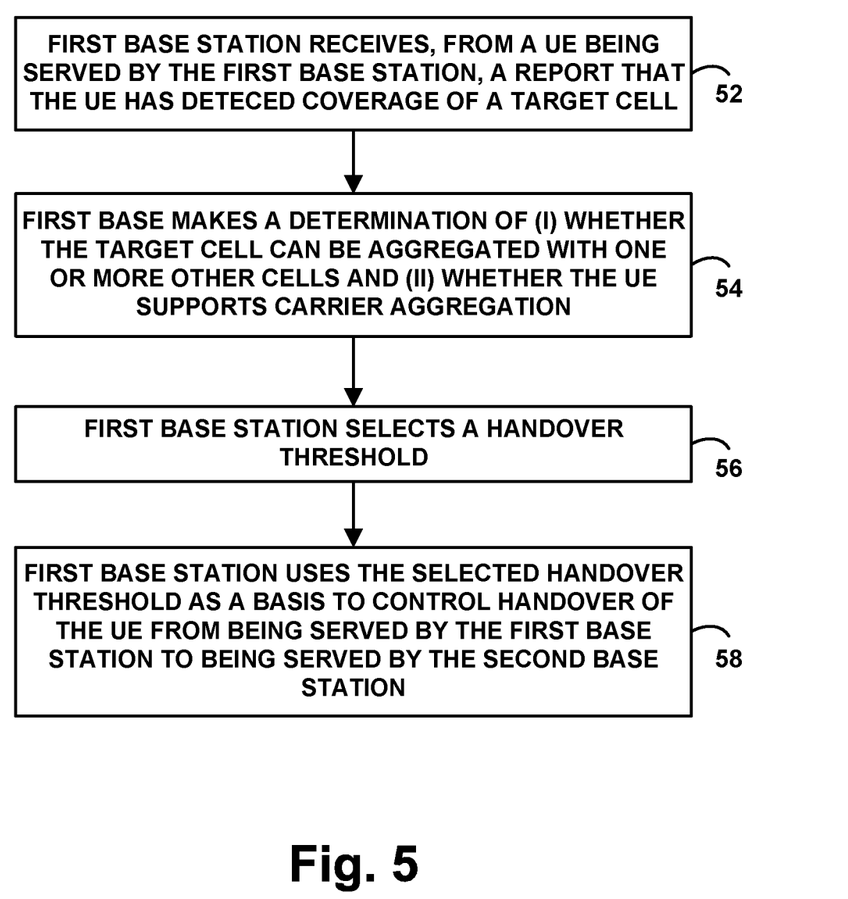
FIG. 5 is a flow chart depicting functions that can be carried out in accordance with the present disclosure.

FIG. 5 is next flow chart depicting functions that can be carried out by a base station (e.g., an eNodeB or other type of base station) in accordance with the present disclosure. In line with the discussion above, the base station may be a first base station in a radio access network that includes the first base station and a second base station.

As shown in FIG. 5, at block 52, the first base station may receive, from a UE being served by the first base station, a report that the UE has detected coverage of a target cell, the target cell being provided by the second base station. At block 54, the first base station makes a determination of (i) whether the target cell can be aggregated with one or more other cells and (ii) whether the UE supports carrier aggregation. Further, at block 56, the first base station selects a handover threshold, with the handover threshold being selected based on the determination. And at block 58, the first base station uses the selected handover threshold as a basis to control handover of the UE from being served by the first base station to being served by the second base station.

In line with the discussion above, in this method, the first base station could select the handover threshold based on consideration of both (i) whether the target cell can be aggregated with one or more other cells and (ii) whether the UE supports carrier aggregation. Further, in this method, the act of using the selected handover threshold as the basis to control the handover of the UE could involve the first base station making a decision, based at least on the selected handover threshold, of whether to trigger the handover of the UE, and the first base station triggering the handover only if the decision is to trigger the handover. Further, the report from the UE could be a measurement report that specifies a signal level of the target cell, and the first base station could make the decision based on the specified signal level of the target cell.

In addition, as discussed above, the handover threshold may take various forms. For instance, the handover threshold may be a minimum extent that signal level of the target cell is required to exceed signal level of a serving cell in order to trigger the handover, or the handover threshold may be a minimum signal level of the target cell in order to trigger the handover. Further, the method could also involve the first base station receiving policy information indicating a carrier-aggregation policy that the second base station imposes for the target cell, and the first base station could then make the determination of whether the target cell can be aggregated with one or more other cells by referring to the received policy information. Additionally, the method could involve the first base station receiving data indicating whether the UE supports carrier aggregation, and the first base station could then make the determination of whether the UE supports carrier aggregation by referring to the received data.

Figure 6:
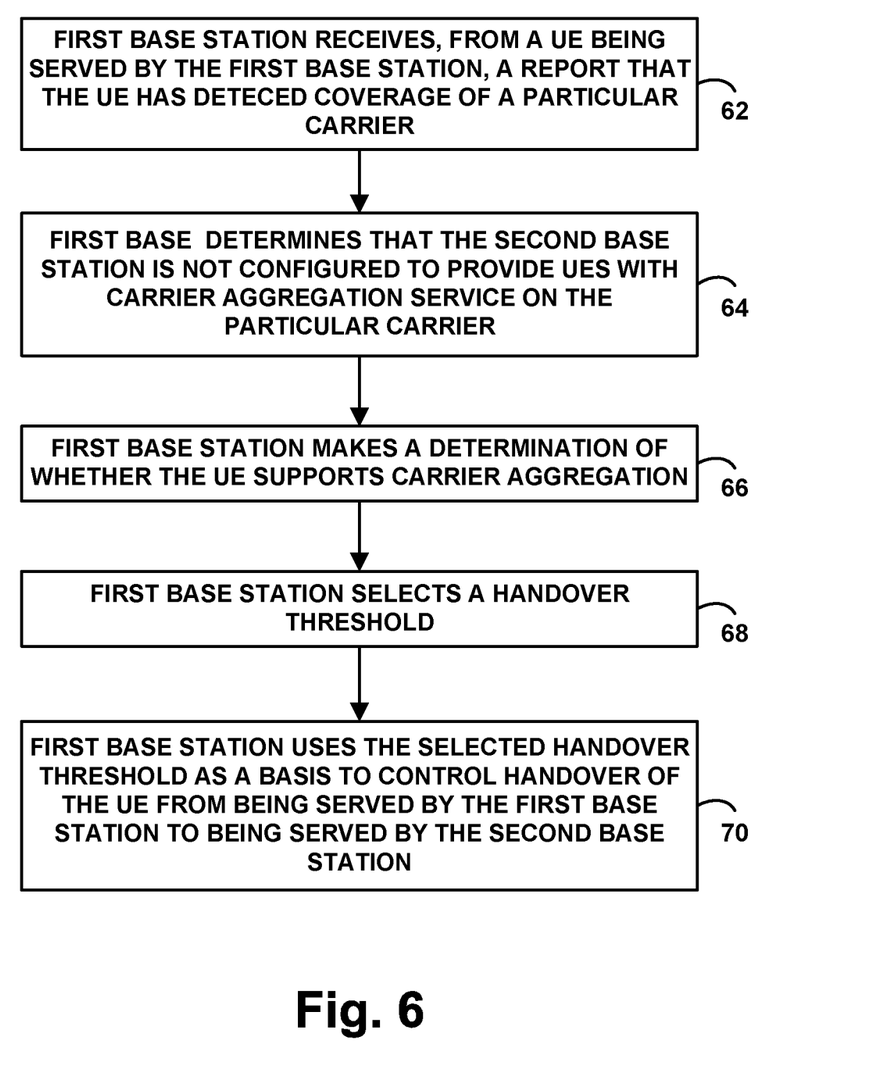
FIG. 6 is another flow chart depicting functions that can be carried out in accordance with the present disclosure.

FIG. 6 is next another flow chart depicting functions that can be carried out by a base station (e.g., an eNodeB or other type of base station) in accordance with the present disclosure. In line with the discussion above, the base station may be a first base station in a radio access network that includes the first base station and a second base station. Further, the first base station may be configured to provide UEs with carrier aggregation service.

As shown in FIG. 6, at block 62, the first base station receives, from a UE being served by the first base station, a report that the UE has detected coverage of a particular carrier, the particular carrier being provided by the second base station. At block 64, the first base station determines that the second base station is not configured to provide UEs with carrier aggregation service on the particular carrier. At block 66, the first base station makes a determination of whether the UE supports carrier aggregation. At block 68, the first base station selects a handover threshold, with the handover threshold being selected based on the determination. And at block 70, the first base station uses the selected handover threshold as a basis to control handover of the UE from being served by the first base station to being served by the second base station.

Other features as discussed above can apply here as well. For instance, the act of using the selected handover threshold as the basis to control the handover of the UE could involve the first base station making a decision, based at least on the selected handover threshold, of whether to trigger the handover of the UE, and the first base station triggering the handover only if the decision is to trigger the handover.

In addition, as discussed above, the handover threshold may take various forms. For instance, the handover threshold may be a minimum extent that signal level of the target cell is required to exceed signal level of a serving cell in order to trigger the handover, or the handover threshold may be a minimum signal level of the target cell in order to trigger the handover. With either type of handover threshold, if the first base station determines that the UE does not support carrier aggregation, the first base station may select a first threshold. Whereas, if the first base station determines that the UE supports carrier aggregation, then the first base station may select a second threshold that is a higher threshold than the first threshold, to help deter or delay handover of the UE to the second base station.

Exemplary embodiments have been described above. It should be understood, however, that variations from these embodiments are possible, while remaining within the scope of the invention.

We claim:

1. A method operable in a radio access network comprising a first base station and a second base station, the method comprising:

receiving by the first base station, from a user equipment device (UE) being served by the first base station, a report that the UE has detected coverage of a target cell, wherein the target cell is provided by the second base station;

making a determination by the first base station of whether (i) the target cell can be aggregated with one or more other cells provided by the second base station and (ii) the UE supports carrier aggregation;

using by the first base station the determination as a basis for selecting a handover threshold from among multiple different handover thresholds;

making a decision by the first base station, based at least on the selected handover threshold, to trigger the handover of the UE; and based on the decision, triggering by the first base station the handover of the UE.

2. The method of claim 1
wherein the report comprises a measurement report that specifies a signal level of the target cell, and wherein the making the decision is further based on the specified signal level of the target cell.

3. The method of claim 2, wherein the handover threshold is a minimum extent that signal level of the target cell is required to exceed signal level of a serving cell in order to trigger the handover, and wherein using the determination as a basis for selecting the handover threshold comprises:
if the determination is that the target cell can be aggregated with one or more other cells provided by the second base station but the UE does not support carrier aggregation or that the UE does support carrier aggregation but the target cell cannot be aggregated with one or more other cells provided by the second base station, then selecting as the handover threshold a first minimum extent,
if the determination is that the target cell can be aggregated with one or more other cells provided by the second base station and the UE supports carrier aggregation, then selecting as the handover threshold a second minimum extent less than the first minimum extent, and
if the determination is that the target cell cannot be aggregated with one or more other cells provided by the second base station and the UE does not support carrier aggregation, then selecting as the handover threshold a third minimum extent less than the first minimum extent.

4. The method of claim 2, wherein the handover threshold is a minimum signal level of the target cell in order to trigger the handover, and wherein using the determination as a basis for selecting the handover threshold comprises:
if the determination is that the target cell can be aggregated with one or more other cells provided by the second base station but the UE does not support carrier aggregation or that the UE does support carrier aggregation but the target cell cannot be aggregated with one or more other cells provided by the second base station, then selecting as the handover threshold a first signal level,
if the determination is that the target cell can be aggregated with one or more other cells provided by the second base station and the UE supports carrier aggregation, then selecting as the handover threshold a second signal level less than the first signal level, and
if the determination is that the target cell cannot be aggregated with one or more other cells provided by the second base station and the UE does not support carrier aggregation, then selecting as the handover threshold a third signal level less than the first signal level.

5. The method of claim 1, further comprising receiving by the first base station policy information indicating a carrier-aggregation policy that the second base station imposes for the target cell,
wherein making the determination of whether the target cell can be aggregated with one or more other cells provided by the second base station comprises referring to the received policy information to make the determination of whether the target cell can be aggregated with one or more other cells provided by the second base station.

6. The method of claim 5:
wherein the carrier-aggregation policy for the target cell is that the target cell can be aggregated with an extent of cell bandwidth,
wherein the selecting is further based on the extent of cell bandwidth.

7. The method of claim 1, further comprising receiving by the first base station data indicating whether the UE supports carrier aggregation,
wherein making the determination of whether the UE supports carrier aggregation comprises referring to the received data to make the determination of whether the UE supports carrier aggregation.

8. The method of claim 7, wherein receiving the data indicating whether the UE supports carrier aggregation comprises receiving in association with an attach process a UE-capability report, wherein the UE-capability report indicates whether the UE supports carrier aggregation.

9. A base station comprising:
an antenna arrangement for wirelessly communicating with user equipment devices (UEs); and
a controller arranged to:
receive via the antenna arrangement, from a UE served by the base station, a report that the UE has detected coverage of a target cell, wherein the target cell is provided by a neighboring base station,
make a determination of whether (i) the target cell can be aggregated with one or more other cells provided by the neighboring base station and (ii) the UE supports carrier aggregation,
use the determination as a basis to select a handover threshold from among multiple different handover thresholds,
make a decision, based at least on the selected handover threshold, to trigger the handover of the UE, and based on the decision, trigger the handover of the UE.

10. The base station of claim 9:
wherein the report comprises a measurement report that specifies a signal level of the target cell, and
wherein the controller is arranged to make the decision based on the specified signal level of the target cell and the selected handover threshold.

11. The base station of claim 10, wherein the handover threshold is a minimum extent that signal level of the target cell is required to exceed signal level of a serving cell in order to trigger the handover, and wherein the controller is arranged to:
select as the handover threshold a first minimum extent if the determination is that the target cell can be aggregated with one or more other cells provided by the neighboring base station but the UE does not support carrier aggregation or that the UE does support carrier aggregation but the target cell cannot be aggregated with one or more other cells provided by the neighboring base station,
select as the handover threshold a second minimum extent less than the first minimum extent if the determination is that the target cell can be aggregated with one or more other cells provided by the neighboring base station and the UE supports carrier aggregation, then, and
select as the handover threshold a third minimum extent less than the first minimum extent if the determination is that the target cell cannot be aggregated with one or more other cells provided by the neighboring base station and the UE does not support carrier aggregation.

12. The base station of claim 10, wherein the handover threshold is a minimum signal level of the target cell in order to trigger the handover, and wherein the controller is arranged to:
- select as the handover threshold a first signal level if the determination is that the target cell can be aggregated with one or more other cells provided by the neighboring base station but the UE does not support carrier aggregation or that the UE does support carrier aggregation but the target cell cannot be aggregated with one or more other cells provided by the neighboring base station,
- select as the handover threshold a second signal level less than the first signal level, if the determination is that the target cell can be aggregated with one or more other cells provided by the neighboring base station and the UE supports carrier aggregation, and
- selecting as the handover threshold a third signal level less than the first signal level if the determination is that the target cell cannot be aggregated with one or more other cells provided by the neighboring base station and the UE does not support carrier aggregation.

13. The base station of claim 9, further comprising a network communication interface through which the base station is configured to receive carrier-aggregation policies,
- wherein the controller is further arranged to receive via the network communication interface information indicating a carrier-aggregation policy that the neighboring station imposes for the target cell, and
- wherein the controller is arranged to refer to the received policy information to make the determination of whether the target cell can be aggregated with one or more other cells provided by the neighboring base station.

14. The base station of claim 13:
- wherein the carrier-aggregation policy for the target cell is that the target cell can be aggregated with an extent of additional cell bandwidth,
- wherein the controller is arranged to select the handover threshold based on the extent of additional cell bandwidth and the determination.

15. A method operable in a radio access network comprising a first base station and a second base station, wherein the first base station is configured to provide user equipment devices (UEs) with carrier aggregation service, the method comprising: receiving by the first base station, from a UE being served by the first base station, a report that the UE has detected coverage of a particular carrier, wherein the particular carrier is provided by the second base station; making by the first base station a first determination that the second base station is not configured to aggregate the particular carrier with any other carriers provided by the second base station; making by the first base station a second determination of whether the UE supports carrier aggregation; using by the first base station the first determination and the second determination as a basis for selecting a handover threshold from among multiple different handover thresholds;
- making a decision by the first base station, based at least on the selected handover threshold, to trigger the handover of the UE; and based on the decision, triggering by the first base station the handover of the UE.

16. The method of claim 15:
- wherein the report comprises a measurement report that specifies a signal level of the particular carrier,
- and wherein the making the decision is further based on the specified signal level of the particular carrier.

17. The method of claim 16, wherein the handover threshold is a minimum extent that signal level of the carrier is required to exceed signal level of a serving cell in order to trigger the handover, and wherein using the determination as a basis for selecting the handover threshold comprises:
- if the determination is that the UE does not support carrier aggregation, then selecting as the handover threshold a first minimum extent, and
- if the determination is that the UE supports carrier aggregation, then selecting as the handover threshold a second minimum extent greater than the first minimum extent.

* * * * *